(12) United States Patent
Matsumoto et al.

(10) Patent No.: US 9,255,503 B2
(45) Date of Patent: Feb. 9, 2016

(54) EXHAUST DEVICE FOR MULTICYLINDER ENGINE

(71) Applicant: MAZDA MOTOR CORPORATION, Hiroshima (JP)

(72) Inventors: Takamasa Matsumoto, Higashihiroshima (JP); Mitsuo Nakamura, Hiroshima (JP); Mikihito Fujii, Aki-gun (JP); Nobuhiro Soumiyou, Hiroshima (JP); Shunki Okazaki, Hiroshima (JP); Yoshito Wakabayashi, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/346,940

(22) PCT Filed: Nov. 27, 2012

(86) PCT No.: PCT/JP2012/007606
§ 371 (c)(1),
(2) Date: Mar. 24, 2014

(87) PCT Pub. No.: WO2013/080521
PCT Pub. Date: Jun. 6, 2013

(65) Prior Publication Data
US 2014/0250874 A1    Sep. 11, 2014

(30) Foreign Application Priority Data
Nov. 29, 2011   (JP) .................................. 2011-260600

(51) Int. Cl.
*F01N 13/10*     (2010.01)
*F01N 3/00*      (2006.01)
(Continued)

(52) U.S. Cl.
CPC .. *F01N 3/00* (2013.01); *F01N 5/00* (2013.01); *F01N 13/02* (2013.01); *F02B 27/00* (2013.01);
(Continued)

(58) Field of Classification Search
CPC ... F01N 3/2892; F01N 13/0093; F01N 13/02; F01N 13/10; F01N 2240/20; F01N 2260/06; F01N 2260/14; F01N 2340/02; F01N 2470/20; F01N 2470/30; F01N 2900/08; F01N 13/1805; F02B 27/04; F02D 13/0261; Y02T 10/18
USPC ............................. 60/299, 313, 322, 323, 324
See application file for complete search history.

(56) References Cited

U.S. PATENT DOCUMENTS 4,731,995 A  *  3/1988  McFarland, Jr. ................ 60/313
5,134,850 A     8/1992  Saito et al.
(Continued)

FOREIGN PATENT DOCUMENTS

JP    64-019118 A    1/1989
JP    H03-229918 A   10/1991
(Continued)

OTHER PUBLICATIONS

International Search Report; PCT/JP2012/007606; Feb. 26, 2013.
(Continued)

*Primary Examiner* — Thomas Denion
*Assistant Examiner* — Jorge Leon, Jr.
(74) *Attorney, Agent, or Firm* — Studebaker & Brackett PC

(57) ABSTRACT

An exhaust device includes a plurality of independent exhaust passages connected to an exhaust port of one cylinder or a plurality of cylinders that are non-sequential in exhaust order, and a mixing pipe into which exhaust that has passed through the respective independent exhaust passages flows. The downstream ends of the respective independent exhaust passages are connected in a bundled form to the upstream end of the mixing pipe. A cavity expansion chamber is disposed in an exhaust passage downstream from the mixing pipe. The cavity expansion chamber is disposed in a position (at a distance L2) such that, in the intermediate speed range, a negative pressure wave generated due to an exhaust pressure wave generated by opening an exhaust valve being reflected by the cavity expansion chamber reaches the exhaust port during an overlap period of the exhaust valve and an intake valve of the cylinder.

15 Claims, 11 Drawing Sheets

(51) Int. Cl.
  *F01N 5/00* (2006.01)
  *F01N 13/02* (2010.01)
  *F02B 27/04* (2006.01)
  *F02D 13/02* (2006.01)
  *F02B 27/00* (2006.01)
  *F01N 13/18* (2010.01)
  *F01N 13/00* (2010.01)
  *F01N 3/28* (2006.01)

(52) U.S. Cl.
  CPC .............. *F02B 27/04* (2013.01); *F02D 13/02* (2013.01); *F02D 13/0261* (2013.01); *F01N 3/2892* (2013.01); *F01N 13/0093* (2014.06); *F01N 13/10* (2013.01); *F01N 13/1805* (2013.01); *F01N 2240/20* (2013.01); *F01N 2260/06* (2013.01); *F01N 2260/14* (2013.01); *F01N 2340/02* (2013.01); *F01N 2470/20* (2013.01); *F01N 2470/30* (2013.01); *F01N 2900/08* (2013.01); *Y02T 10/146* (2013.01); *Y02T 10/16* (2013.01); *Y02T 10/18* (2013.01)

(56) References Cited

U.S. PATENT DOCUMENTS

| | | | |
|---|---|---|---|
| 2004/0144361 A1* | 7/2004 | Wallis | 123/347 |
| 2011/0265763 A1* | 11/2011 | Kruger et al. | 123/434 |
| 2013/0152901 A1* | 6/2013 | Shishime et al. | 123/48 R |
| 2013/0306025 A1* | 11/2013 | Matsumoto et al. | 123/345 |

FOREIGN PATENT DOCUMENTS

| | | |
|---|---|---|
| JP | 04-036023 A | 2/1992 |
| JP | 2000-154715 A | 6/2000 |
| JP | 2005-248814 A | 9/2005 |
| JP | 2011-111932 A | 6/2011 |
| JP | 2011-214438 A | 10/2011 |
| WO | WO2012026059 A1 * | 3/2012 |
| WO | WO2012098833 A1 * | 7/2012 |

OTHER PUBLICATIONS

An Office Action; "Notice of Reasons for Rejection," issued by the Japanese Patent Office on Aug. 18, 2015, which corresponds to Japanese Patent Application No. 2011-260600 and is related to U.S. Appl. No. 14/346,940; with English language summary.

* cited by examiner

EXHAUST DEVICE FOR MULTICYLINDER ENGINE

TECHNICAL FIELD

The present invention relates to an exhaust device for a multicylinder engine mounted to an automobile or the like.

BACKGROUND ART

Conventionally, development of an exhaust device with a purpose of improving the torque has been conducted for multicylinder engines mounted to an automobile or the like.

For example, Patent Document 1 discloses a technique in which exhaust passages of cylinders that are non-sequential in exhaust order are bundled and converged as a tapered exhaust pipe, and an ejector effect is provided in this narrowed portion to prevent exhaust interference between the cylinders.

Patent Document 1: Japanese Patent Application Laid-open No. H04-036023 (page 4, page 5, and FIG. 3)

SUMMARY OF THE INVENTION

In a multicylinder engine, preventing a fall in volumetric efficiency ($\eta V$) in an intermediate rotation range (intermediate speed range) of, for example, 3000 to 3500 rpm is an important factor in improving the torque over a wide rotation range and achieving an increase in the range of torque.

Thus, an object of the present invention is to provide an exhaust device for a multicylinder engine capable of preventing a fall in volumetric efficiency in an intermediate speed range.

As a solution to a task described above, the present invention is an exhaust device for a multicylinder engine, including a plurality of cylinders each including an intake port, an exhaust port, an intake valve capable of opening and closing the intake port, and an exhaust valve capable of opening and closing the exhaust port, wherein the exhaust device includes a plurality of independent exhaust passages each having an upstream end connected to an exhaust port of one cylinder or a plurality of cylinders that are non-sequential in exhaust order, and a mixing pipe connected to downstream ends of the respective independent exhaust passages and into which exhaust that has passed through the respective independent exhaust passages flows, the downstream ends of the respective independent exhaust passages are connected in a bundled form to the mixing pipe, a cavity expansion chamber including a space section in which a flow path sectional area is increased is disposed in an exhaust passage downstream from the mixing pipe, a distance from a seating position of the exhaust valve in the exhaust port of each cylinder to an upstream end of the cavity expansion chamber is set to a distance such that, in a first operation region including at least an intermediate speed range in which an engine rotation speed is greater than or equal to a first reference rotation speed set in advance and less than or equal to a second reference rotation speed higher than the first reference rotation speed, a negative pressure wave is generated due to an exhaust pressure wave generated by opening the exhaust valve reaching and being reflected by the cavity expansion chamber and the negative pressure wave reaches the exhaust port of the cylinder during an overlap period in which an open period of the exhaust valve and an open period of the intake valve of the cylinder of which the exhaust valve has been opened overlap for a predetermined period, and a valve driving device for driving the intake valve and the exhaust valve of each cylinder is provided so that an open period of the exhaust valve and an open period of the intake valve of each cylinder overlap for a predetermined period and, for cylinders that are sequential in exhaust order, the exhaust valve of a subsequent cylinder opens during the overlap period of a preceding cylinder, in a predetermined operation region including at least low and intermediate speed ranges in which the engine rotation speed is less than or equal to the second reference rotation speed.

The above and other objects, features, and advantages of the present invention will become clear from the detailed description below and accompanying drawings.

MODE FOR CARRYING OUT THE INVENTION

(1) Overall Configuration

Figure 1:
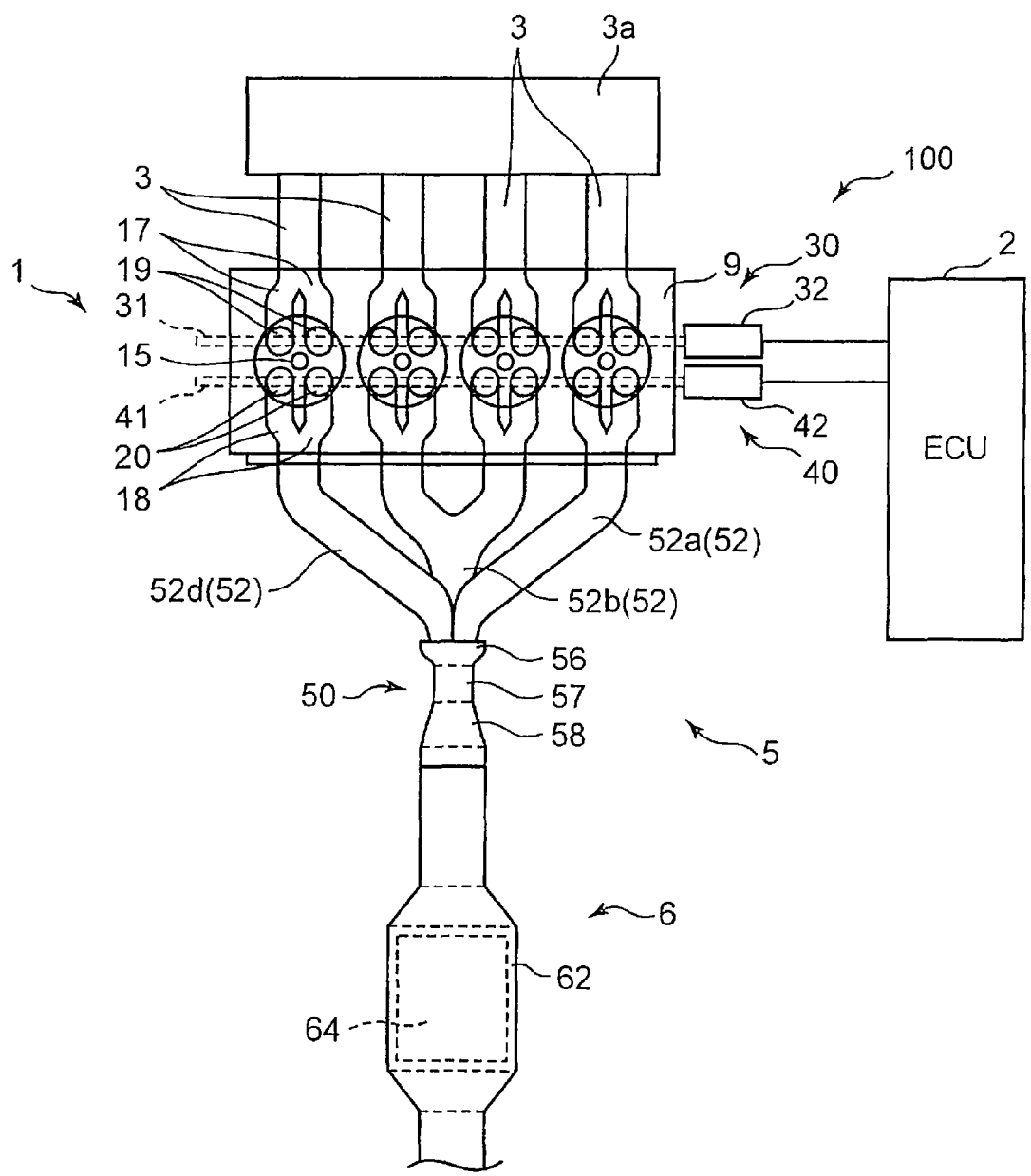
FIG. 1 is a schematic configuration diagram of an exhaust device for a multicylinder engine according to an embodiment of the present invention.
Figure 2:
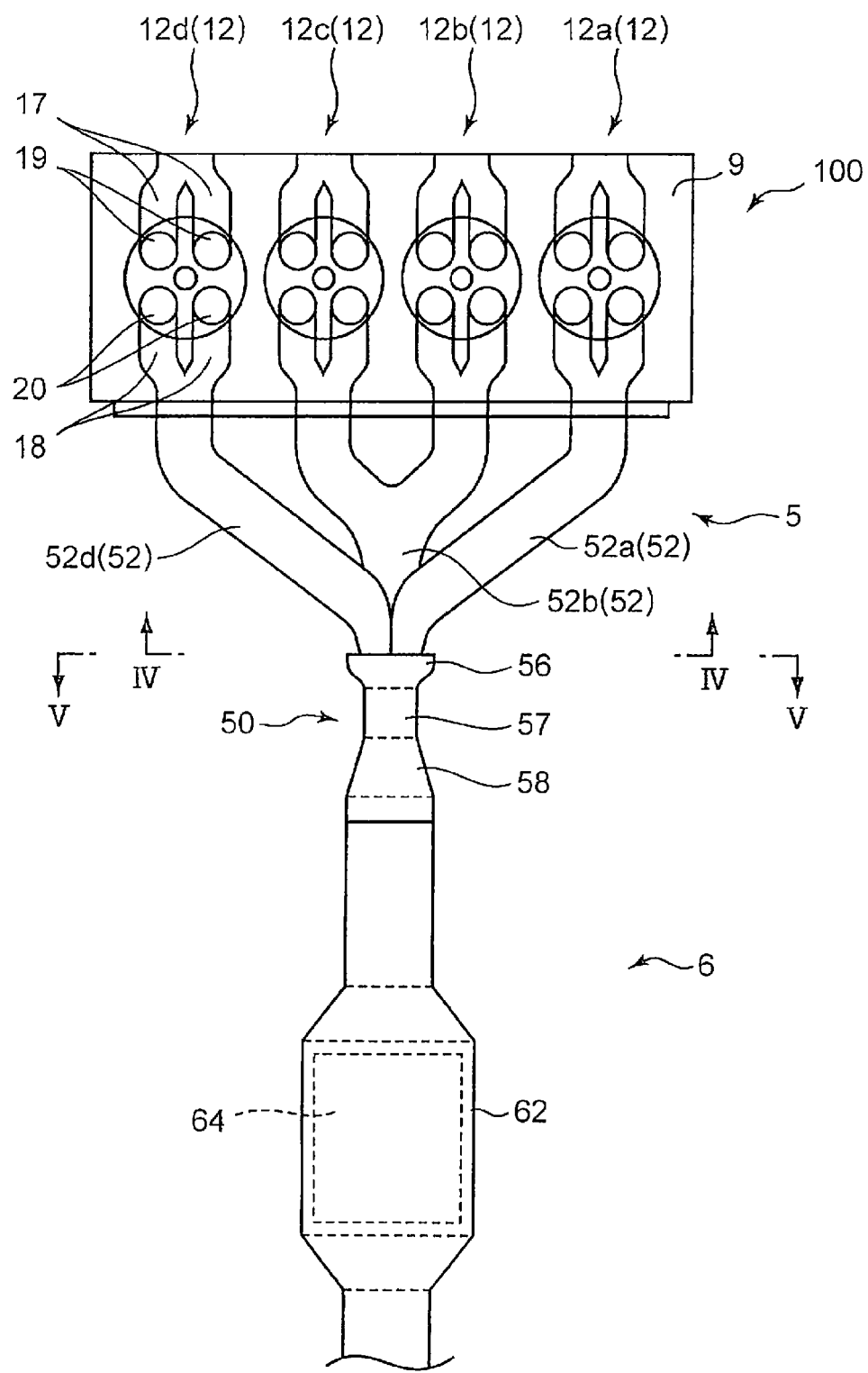
FIG. 2 is an enlarged view of a main portion in FIG. 1.
Figure 3:
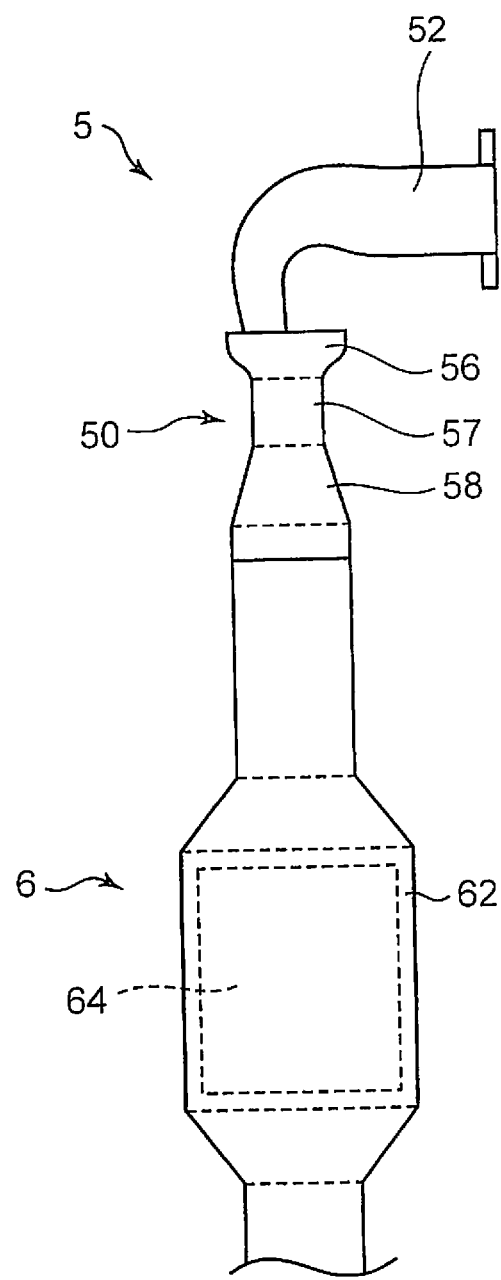
FIG. 3 is a side view of a main portion in FIG. 2.

FIG. 1 is a schematic configuration diagram of an exhaust device 100 for a multicylinder engine according to an embodiment of the present invention. FIG. 2 is an enlarged view of a main portion in FIG. 1. FIG. 3 is a side view of a main portion in FIG. 2 (with an independent exhaust passage 52b being omitted in the drawing). The device 100 includes an engine body 1 including a cylinder head 9 and a cylinder block (not shown), an ECU 2 for engine control, an exhaust manifold 5 connected to the engine body 1, and a catalytic device 6 connected to the exhaust manifold 5.

Inside the cylinder head 9 and cylinder block, a plurality of (four in an example of the drawing) cylinders 12 each of which is fitted and inserted with a piston are formed. In this embodiment, the engine body 1 is an inline-four engine. Inside the cylinder head 9 and the cylinder block, four cylinders 12 are formed in a state of being aligned in series. Specifically, a first cylinder 12a, a second cylinder 12b, a third cylinder 12c, and a fourth cylinder 12d are formed in order from the right in FIG. 1 and FIG. 2. In the cylinder head 9, each spark plug 15 is installed to face the inside of a combustion chamber segmented above the piston.

Figure 6:
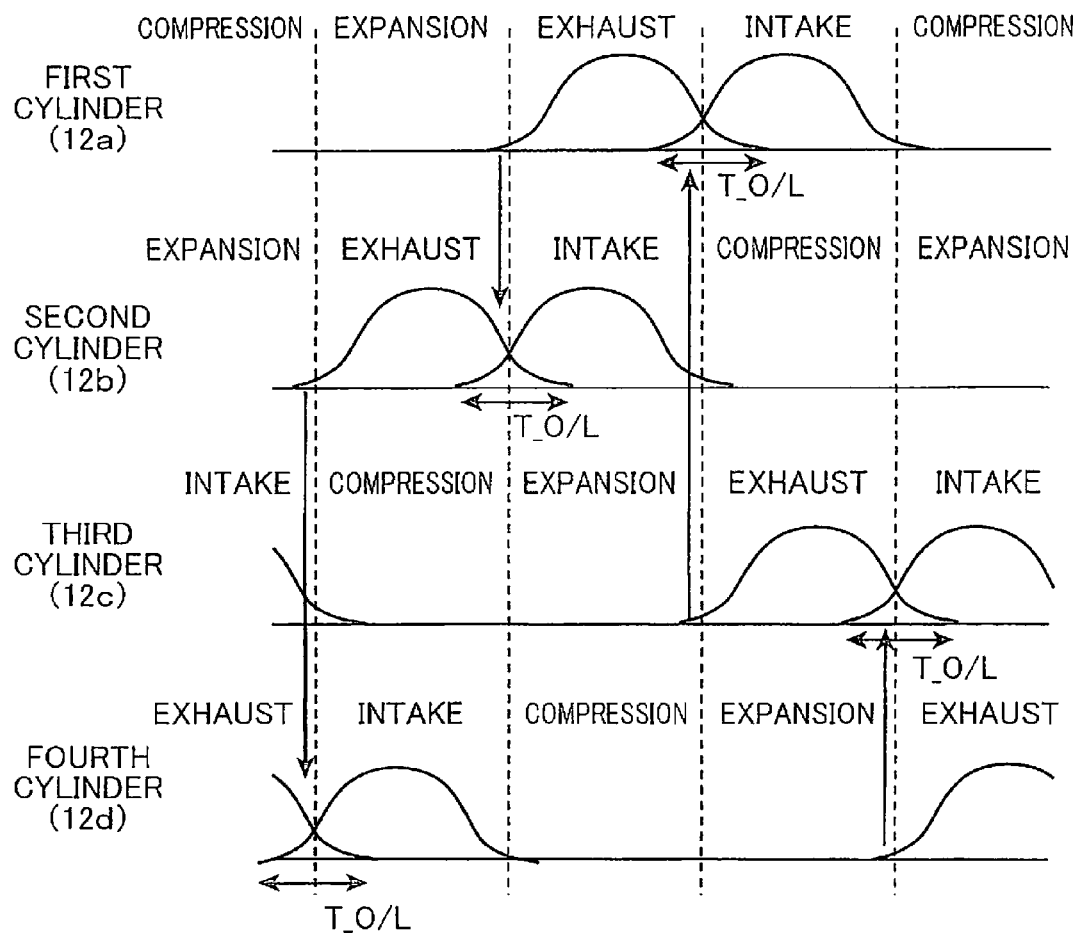
FIG. 6 is an illustration diagram in which the open period of an exhaust valve and the open period of an intake valve of each cylinder of the engine overlap for a predetermined period.

The engine body 1 is a four-stroke engine. In the respective cylinders 12a to 12d, as shown in FIG. 6, ignition by the spark plugs 15 is performed at timings with 180° intervals in CA, and respective strokes of an intake stroke, compression stroke, expansion stroke, and exhaust stroke are each performed at timings with 180° intervals in CA. In this embodiment, ignition is performed in the order of the first cylinder 12a, the third cylinder 12c, the fourth cylinder 12d, and the second cylinder 12b, and the respective strokes are carried out in this order.

The cylinder head 9 is provided with two intake ports 17 and two exhaust ports 18 each open toward the combustion chamber. The intake port 17 is for introducing intake air into each cylinder 12. The exhaust port 18 is for discharging exhaust from within each cylinder 12. The respective intake ports 17 are provided with an intake valve 19 for causing communication or non-communication between the intake port 17 and the inside of the cylinder 12 through opening or closing of the intake ports 17. The respective exhaust ports 18 are provided with an exhaust valve 20 for causing communication or non-communication between the exhaust port 18 and the inside of the cylinder 12 through opening or closing of the exhaust ports 18. The intake valve 19 opens or closes the intake port 17 at a predetermined timing by being driven by an intake valve driving mechanism (a valve driving device) 30. The exhaust valve 20 opens or closes the exhaust port 18 at a predetermined timing by being driven by an exhaust valve driving mechanism (a valve driving device) 40.

The intake valve driving mechanism 30 includes an intake camshaft 31 coupled to the intake valve 19 and an intake VVT 32. The intake camshaft 31 is coupled to a crankshaft with a power transmission mechanism therebetween such as a known chain or sprocket mechanism to rotate along with the rotation of the crankshaft and drive the intake valve 19 to open or close. The intake VVT 32 is for changing a valve timing of the intake valve 19.

The intake VVT 32 changes a phase difference between the intake camshaft 31 and a predetermined driven shaft arranged coaxially with the intake camshaft 31 and driven directly by the crankshaft. Accordingly, by changing a phase difference between the crankshaft and the intake camshaft 31, the valve timing of the intake valve 19 is changed. Examples of the specific configuration of the intake VVT 32 include a liquid-pressure mechanism that includes a plurality of liquid chambers aligned in the circumferential direction between the driven shaft and the intake camshaft 31 and changes the phase difference by providing a pressure difference between the liquid chambers or an electromagnetic mechanism in which an electromagnet is disposed between the driven shaft and the intake camshaft 31 to change the phase difference by providing electric power to the electromagnet. The intake VVT 32 changes the phase difference based on a target valve timing of the intake valve 19 calculated with the ECU 2.

The intake ports 17 of the respective cylinders 12 are each connected with an intake passage 3. The upstream ends of the respective intake passages 3 are each connected to a surge tank 3a.

The exhaust valve driving mechanism 40 has a configuration similar to the intake valve driving mechanism 30. That is, the exhaust valve driving mechanism 40 includes an exhaust camshaft 41 coupled to the exhaust valve 20 and the crankshaft and an exhaust VVT 42 that changes the valve timing of the exhaust valve 20 by changing a phase difference of the exhaust camshaft 41 and the crankshaft. The exhaust VVT 42 changes the phase difference based on a target valve timing of the exhaust valve 20 calculated with the ECU 2. In accordance with the phase difference, the exhaust camshaft 41 rotates along with the rotation of the crankshaft to drive the exhaust valve 20 to open or close at the target valve timing.

In this embodiment, the intake VVT 32 and exhaust VVT 42 respectively change the opening time (opening start time shown in FIG. 7) and the closing time of the intake valve 19 and the exhaust valve 20 while maintaining each of the open period and lift amount, i.e., the valve profile, of the intake valve 19 and the exhaust valve 20 to be constant.

Figure 7:
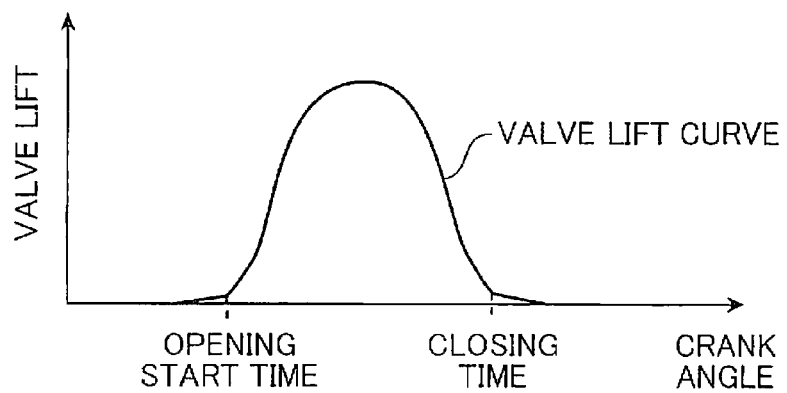
FIG. 7 is an illustration diagram of the open period of the intake valve and exhaust valve.

In this embodiment, the opening time (opening start time) and the closing time of the intake valve 19 and exhaust valve 20 respectively refer to the opening start time and the closing completion time in the case where an interval excluding a portion (ramp section) with a gentle inclination of valve lift near the opening and near the closing of the valve is assumed as the open period, as shown in FIG. 7. For example, in the case where the height of the ramp section is 0.4 mm, the time at which there has been an increase and the time at which there has been a decrease in the valve lift to 0.4 mm are respectively the opening time and the closing time.

(2) Configuration of Exhaust System

The exhaust manifold 5 includes, in order from the upstream side, three independent exhaust passages 52 and a mixing pipe 50 connected to the downstream end of each independent exhaust passage 52 and into which exhaust that has passed through each independent exhaust passage 52 flows. The mixing pipe 50 includes, on the axis thereof and in order from the upstream side, a converging section 56 in which the flow path sectional area decreases toward the downstream side, a straight section 57 that extends to the downstream side with the flow path sectional area at the downstream end of the converging section 56 (minimum flow path sectional area of the mixing pipe 50) being maintained, and a diffuser section 58 in which the flow path sectional area increases toward the downstream side.

The respective independent exhaust passages 52 are connected at the upstream end to the exhaust port 18 of the respective cylinders 12. Specifically, in the cylinders 12, the exhaust port 18 of the first cylinder 12a and the exhaust port 18 of the fourth cylinder 12d are separately connected to the upstream ends of the respective ones of the independent exhaust passages 52a and 52d. The exhaust port 18 of the second cylinder 12b and the exhaust port 18 of the third cylinder 12c of which the exhaust strokes are not adjacent and the exhaust order is not sequential are connected to the upstream end of the one common independent exhaust passage 52b in terms of simplifying the structure. In more detail, the independent exhaust passage 52b connected to the exhaust port 18 of the second cylinder 12b and the exhaust port 18 of the third cylinder 12c diverges into two passages on the upstream side thereof, the exhaust port 18 of the second cylinder 12b is connected to the upstream end of one, and the exhaust port 18 of the third cylinder 12c is connected to the upstream end of the other.

In this embodiment, the independent exhaust passage 52b corresponding to the second cylinder 12b and the third cylinder 12c extends between the cylinders 12b and 12c, i.e., in a position facing approximately the middle portion of the engine body 1, toward the converging section 56 of the mixing pipe 50. The independent exhaust passages 52a and 52d respectively corresponding to the first cylinder 12a and the fourth cylinder 12d extend while being curved from a position facing the respective cylinders 12*a* and 12*d* toward the converging section 56 of the mixing pipe 50.

The independent exhaust passages 52*a*, 52*b*, and 52*d* are independent from each other. Exhaust discharged from the first cylinder 12*a*, exhaust discharged from the second cylinder 12*b* or the third cylinder 12*c*, and exhaust discharged from the fourth cylinder 12*d* pass through the respective independent exhaust passages 52*a*, 52*b*, and 52*d* independently from each other and are discharged to the downstream side. Exhaust that has passed through the respective independent exhaust passages 52*a*, 52*b*, and 52*d* flows into the converging section 56 of the mixing pipe 50.

The converging section 56 and the respective independent exhaust passages 52 have a shape such that, along with exhaust being blown at high speed from each independent exhaust passage 52 and the exhaust flowing into the converging section 56 at high speed, negative pressure is generated within another adjacent independent exhaust passage 52 and the exhaust port 18 that communicates with this independent exhaust passage 52 due to a negative pressure effect, i.e., ejector effect, within the mixing pipe 50 that occurs around the exhaust at high speed and exhaust within the exhaust port 18 is sucked out to the downstream side.

Specifically, the converging section 56 has a shape in which the flow path sectional area decreases toward the downstream side, so that exhaust discharged from the respective independent exhaust passages 52 flows to the downstream side while maintaining high speed. In this embodiment, the flow path sectional area on the downstream side of the converging section 56 is set to be less than the total of the flow path sectional areas at the downstream ends of the respective independent exhaust passages 52, in order to further increase the speed of exhaust. In this embodiment, the converging section 56 has a shape of a reverse circular truncated cone (funnel shape) in which the diameter decreases toward the downstream side.

In this manner, the flow path sectional area on the downstream side is less than the flow path sectional area on the upstream side in the converging section 56 and the straight section 57. Therefore, exhaust passes through the converging section 56 and the straight section 57 at high speed. At the time of passing, the exhaust decreases in pressure and temperature. Therefore, external heat discharge of exhaust is reduced in the converging section 56 and straight section 57. Exhaust that has passed through the straight section 57 flows into the diffuser section 58 in which the flow path sectional area increases toward the downstream. Accordingly, the exhaust restores pressure and temperature and is discharged to the catalytic device 6 on the downstream side while maintaining high temperature.

The catalytic device 6 is a device for purifying exhaust discharged from the engine body 1. The catalytic device 6 includes a catalyst body (catalyst carrier) 64 and a catalyst case 62 that accommodates the catalyst body 64. The catalyst case 62 has an approximately cylindrical shape that extends in parallel with the distribution direction of exhaust. The catalyst body 64 is for purifying harmful substances within exhaust and has a three-way catalytic function under atmosphere of theoretical air fuel ratio. The catalyst body 64 contains a three-way catalyst, for example.

The catalyst body 64 is accommodated in an increased diameter portion in the middle of the catalyst case 62 in the exhaust distribution direction. At the upstream end of the catalyst case 62, a predetermined space is formed. The downstream end of the diffuser section 58 of the mixing pipe 50 is connected to the upstream end of the catalyst case 62. Exhaust discharged from the diffuser section 58 flows into the upstream end of the catalyst case 62, and then proceeds to the catalyst body 64 side.

As described above, exhaust at high temperature is discharged to the downstream side from the diffuser section 58 of the mixing pipe 50. Therefore, by the catalytic device 6 being connected directly to the mixing pipe 50, exhaust at relatively high temperature flows into the catalytic device 6. Accordingly, the catalyst body 64 is activated at an early point, and the active state of the catalyst body 64 is maintained reliably. The catalytic device 6 is called "direct catalyst."

Figure 4:
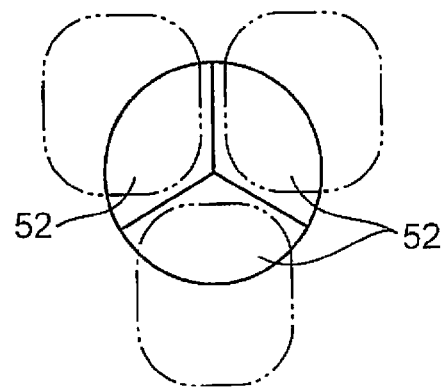
FIG. 4 is a sectional view along line IV-IV in FIG. 2.
Figure 5:
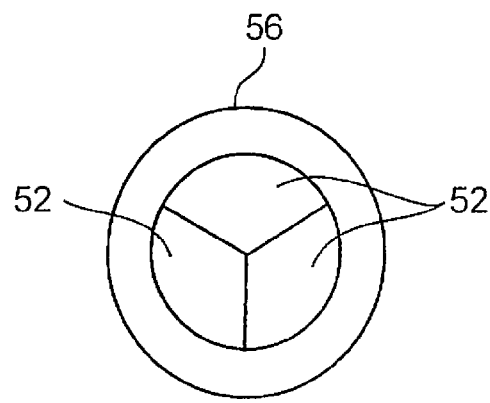
FIG. 5 is a sectional view along line V-V in FIG. 2.

A downstream section of the respective independent exhaust passages 52 has a shape in which the flow path sectional area thereof decreases toward the downstream, so that exhaust is blown into the converging section 56 at high speed from each independent exhaust passage 52. In this embodiment, as shown in FIG. 4, each independent exhaust passage 52 decreases in sectional area thereof toward the downstream from an upstream-side portion (in virtual line) having approximately an elliptical shaped sectional surface. The downstream end thereof is in a fan shape in which the sectional area (flow path sectional area) is approximately one third of the area of the elliptical shaped sectional surface in the upstream-side portion. As shown in FIG. 5, the respective fan-shaped downstream ends of the independent exhaust passages 52 converge and are connected to the upstream end of the converging section 56, so as to be adjacent to each other and form an approximately circular sectional surface as a whole (see FIG. 1 and FIG. 2).

That is, the sectional shapes at the downstream ends of the respective independent exhaust passages 52 in a direction orthogonal to the axis of the mixing pipe 50 are formed approximately in fan shapes that are identical to each other (see FIG. 4 and FIG. 5), the downstream ends of the respective independent exhaust passages 52 are connected to the upstream end of the converging section 56 of the mixing pipe 50 in a state where the downstream ends of the respective independent exhaust passages 52 are bundled such that the fan shapes converge to form an approximate circle.

Figure 8:
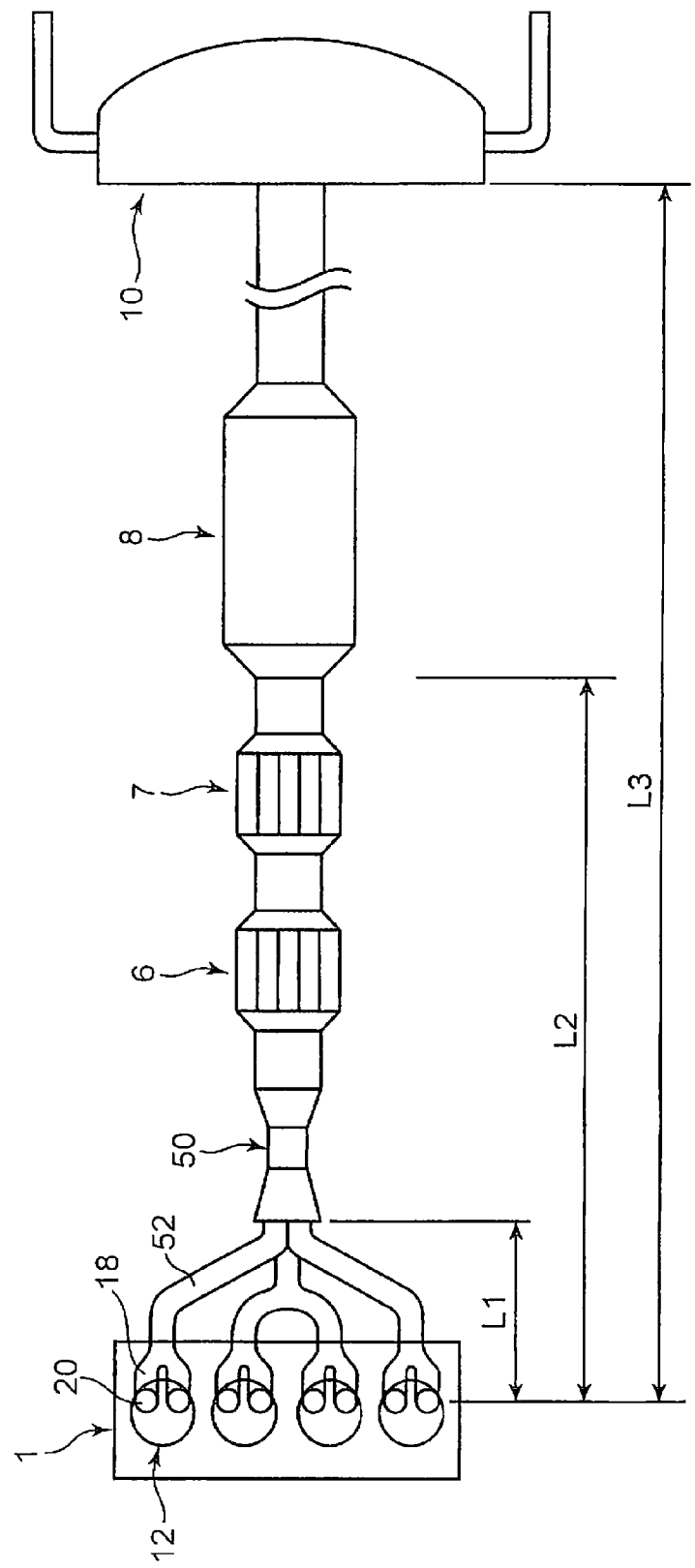
FIG. 8 is an overall configuration diagram of an exhaust system of the engine.

As shown in FIG. 8, a second catalytic device 7 is disposed downstream from the direct catalyst 6. In a similar manner to the direct catalyst 6, the second catalytic device 7 is a device for purifying exhaust discharged from the engine body 1. Although not shown in detail, the catalytic device 7 also includes a catalyst body (catalyst carrier) containing a three-way catalyst and a catalyst case that accommodates the catalyst body. The catalyst case has an approximately cylindrical shape that extends in parallel with the distribution direction of exhaust. The catalytic device 7 is called "underfoot catalyst."

(3) Feature of this Embodiment

As shown in FIG. 8, a pre-silencer 8 is disposed downstream from the underfoot catalyst 7. The pre-silencer 8 is of a structure having therein a space section in which the flow path sectional area is increased (i.e., is a cavity expansion chamber). In this embodiment, the volume of an internal space section of the pre-silencer 8 is set to be a volume greater than the volume of an internal space section of a middle diameter-increased portion of the catalyst case 62 of the direct catalyst 6 or the volume of an internal space section in a middle diameter-increased portion of the catalyst case of the underfoot catalyst 7.

As shown in FIG. 8, a main silencer 10 is disposed downstream from the pre-silencer 8. The main silencer 10 is disposed at a last section in an exhaust system. The main silencer 10 is of a structure having therein a space section in which the flow path sectional area is increased. In this embodiment, the volume of an internal space section of the main silencer 10 is set to be a volume greater than the volume of the internal space section of the pre-silencer 8, the volume of the internal space section of the middle diameter-increased portion in the catalyst case 62 of the direct catalyst 6, or the volume of the internal space section in the middle diameter-increased portion of the catalyst case of the underfoot catalyst 7.

That is, the catalyst cases of the catalytic devices 6 and 7 are disposed in an exhaust passage downstream from the mixing pipe 50, the pre-silencer 8 is disposed in an exhaust passage downstream from the catalyst cases, and the main silencer 10 is disposed in an exhaust passage downstream from the pre-silencer 8.

In this embodiment, as is clear from FIG. 8, the catalyst cases of the catalytic devices 6 and 7 that accommodate the catalyst carrier are disposed in the exhaust passage downstream from the mixing pipe 50, the pre-silencer 8 is disposed in an exhaust passage downstream from the catalyst cases, and an increase rate A of the flow path sectional area of the pre-silencer 8 with respect to the flow path sectional area of an exhaust passage connected to the upstream side of the pre-silencer 8 and an increase rate B of the flow path sectional area of the catalyst case with respect to the flow path sectional area of the exhaust passage connected to the upstream side of the catalyst case are set such that A>B.

The increase rate A is expressed as the flow path sectional area of the pre-silencer 8 over the flow path sectional area of the exhaust passage connected to the upstream side of the pre-silencer 8, and the increase rate B is expressed as the flow path sectional area of the catalyst case over the flow path sectional area of the exhaust passage connected to the upstream side of the catalyst case.

In this embodiment, a distance L1 from the seating position (opening where the exhaust port 18 faces the cylinder 12) of the exhaust valve 20 in the exhaust port 18 of each cylinder 12 to the downstream end of each independent exhaust passage 12 (upstream end of the converging section 56 of the mixing pipe 50) is set to be less than or equal to 500 mm, preferably less than or equal to 400 mm, and more preferably less than or equal to 300 mm.

In this embodiment, a distance L2 from the seating position of the exhaust valve 20 in the exhaust port 18 of each cylinder 12 to the upstream end of the pre-silencer 8 is set to be 1600 mm to 2000 mm, preferably about 1800 mm.

In this embodiment, a distance L3 from the seating position of the exhaust valve 20 in the exhaust port 18 of each cylinder 12 to the upstream end of the main silencer 10 is set to be 3800 mm to 4200 mm, preferably about 4000 mm.

In this embodiment, the pre-silencer 8 having the space section in which the flow path sectional area is increased is disposed in the exhaust passage downstream from the mixing pipe 50, and the main silencer 10 having the space section in which the flow path sectional area is increased is disposed in the exhaust passage downstream from the pre-silencer 8, roughly for the following reason.

Figure 9:
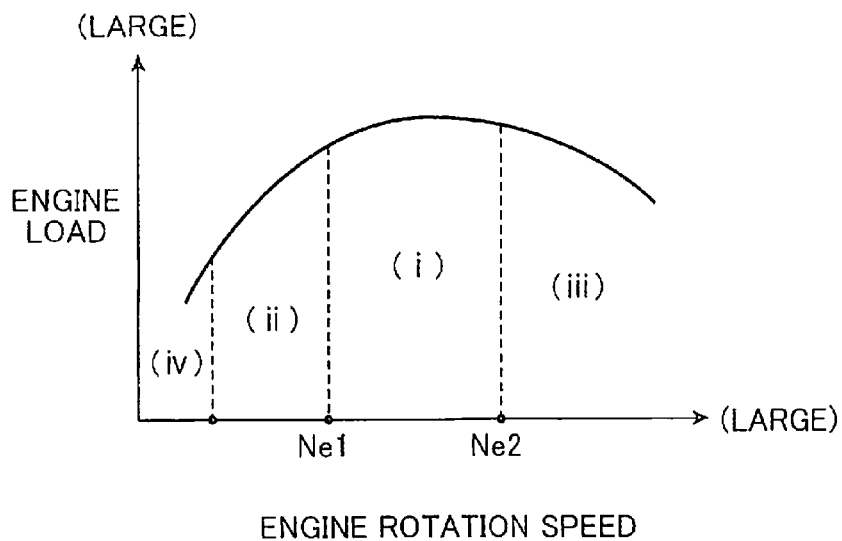
FIG. 9 is an illustration diagram of an operation region of the engine.

First, in this embodiment, as shown in FIG. 9, the setting is such that a region in which the engine rotation speed is greater than or equal to a first reference rotation speed Ne1 set in advance and less than or equal to a second reference rotation speed Ne2 set in advance to be higher than the first reference rotation speed Ne1 is a first operation region (i), a region in which the engine rotation speed is less than the first reference rotation speed Ne1 is a second operation region (ii), and a region in which the engine rotation speed exceeds the second reference rotation speed Ne2 is a third operation region (iii).

The first reference rotation speed Ne1 is, for example, 2500 rpm to 3000 rpm, and the second reference rotation speed Ne2 is, for example, 3500 rpm to 4000 rpm. The first operation region (i) is an intermediate speed range, the second operation region (ii) is a low speed range, and the third operation region (iii) is a high speed range. Further, a fourth operation region (iv) in which the engine rotation speed is, for example, less than 1200 rpm is an extremely low speed range.

In the low speed range (ii) and intermediate speed range (i), as shown in FIG. 6, the setting is such that the open period of the exhaust valve 20 and the open period of the intake valve 19 of the respective cylinders 12 overlap with a top dead center (TDC) in between, and, during an overlap period T_O/L of one cylinder (preceding cylinder) 12 of the cylinders 12, 12 that are sequential in exhaust order, the exhaust valve 20 of the other cylinder (subsequent cylinder) 12 starts opening. Specifically, as shown in FIG. 6, the setting is such that the exhaust valve 20 of the third cylinder 12c opens during a period of overlap of the exhaust valve 20 and the intake valve 19 of the first cylinder 12a, the exhaust valve 20 of the fourth cylinder 12d opens during a period of overlap of the exhaust valve 20 and the intake valve 19 of the third cylinder 12c, the exhaust valve 20 of the second cylinder 12b opens during a period of overlap of the exhaust valve 20 and the intake valve 19 of the fourth cylinder 12d, and the exhaust valve 20 of the first cylinder 12a opens during a period of overlap of the exhaust valve 20 and the intake valve 19 of the second cylinder 12b.

That is, in the low and intermediate speed ranges (ii) and (i), the ECU 2 controls the intake valve driving mechanism 30 and the exhaust valve driving mechanism 40 such that the open period of the exhaust valve 20 and the open period of the intake valve 19 of each cylinder 12 overlap for a predetermined period and, for the cylinders 12, 12 that are sequential in exhaust order, the exhaust valve 20 of the subsequent cylinder 12 opens during the overlap period T_O/L of the preceding cylinder 12.

Accordingly, along with the exhaust valve 20 of the cylinder 12 in the exhaust stroke being opened and blowdown gas passing through the independent exhaust passage 52 from the cylinder 12 in the exhaust stroke to be blown at high speed to the converging section 56, negative pressure is generated by the ejector effect within the exhaust port 18 of the cylinder 12 in the intake stroke during the overlap period T_O/L. Therefore, the ejector effect extends not only to the exhaust port 18 of the cylinder 12 in the intake stroke in the overlap period T_O/L but also to the intake port 17 of the cylinder 12 in the intake stroke from the cylinder 12 in the intake stroke, and scavenging is further promoted within the cylinder 12 in the intake stroke in the overlap period T_O/L.

Figure 10:
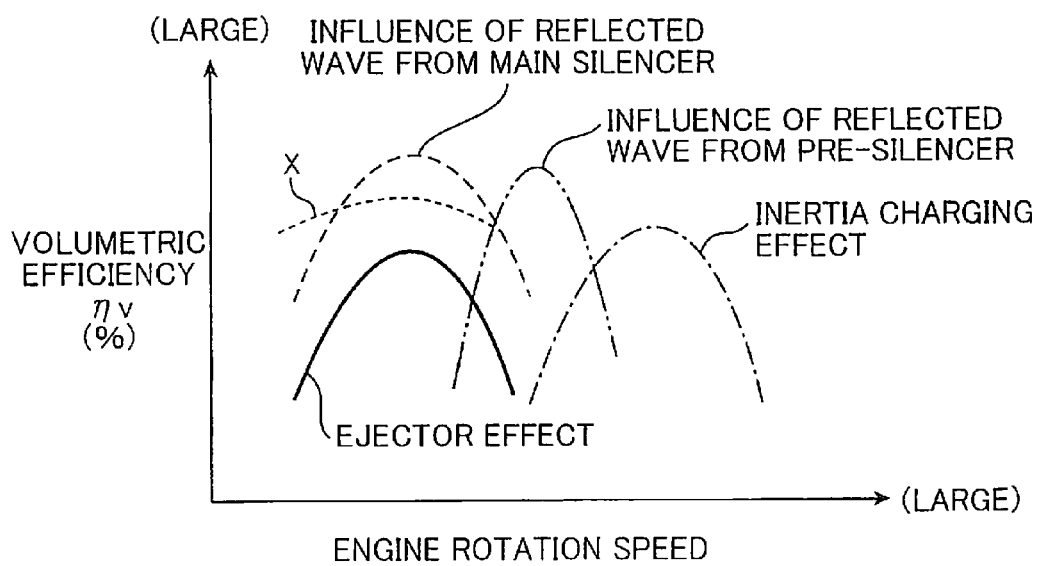
FIG. 10 is an illustration diagram of an effect (relationship of engine rotation speed and improvement in volumetric efficiency) in the embodiment.

As a result, as shown by a solid line in FIG. 10, the volumetric efficiency ($\eta V$) is improved by the ejector effect in the multicylinder engine according to this embodiment, at least in the low speed range (ii) in which the engine rotation speed is relatively low (e.g., greater than or equal to 1200 rpm and less than 2500 rpm to 3000 rpm) and in the intermediate speed range (i) in which the engine rotation speed is, for example, greater than or equal to 2500 rpm to 3000 rpm and less than or equal to 3500 rpm to 4000 rpm.

In order for the ejector effect to be exerted sufficiently in a favorable manner in such low and intermediate speed ranges (ii) and (i), the distance L1 shown in FIG. 8 described above is set to be less than or equal to 500 mm, preferably less than or equal to 400 mm, and more preferably less than or equal to 300 mm.

In this embodiment, as described above (see FIG. 1), an intake system is such that the intake passage 3 is connected to the intake port 17 of each cylinder 12, and the surge tank 3a is connected to the upstream end of each intake passage 3. In the high speed range (iii), the intake system is set such that a positive pressure wave generated by reflection of a negative pressure wave if intake air generated by opening the intake valve 19 reaches the intake port 17 immediately before closing of the intake valve 19. For example, the length of the intake passage 3, the diameter of the intake passage 3, the volume of the surge tank 3a, and the like are set such that a negative pressure wave of intake air generated by opening the intake valve 19 reaches the surge tank 3a through the intake passage 3 from the intake port 17, a part of the arrived negative pressure wave passes through the surge tank 3a and is partially reversed to a positive pressure wave at the surge tank 3a, and the reversed positive pressure wave is reflected to reach the intake port 17 immediately before closing of the intake valve 19 of the cylinder 12.

As a result, in the high speed range (iii) in which the engine rotation speed is relatively high (e.g., over 3500 rpm to 4000 rpm), the volumetric efficiency ($\eta V$) is improved by an inertia charging effect of intake air in the multicylinder engine according to this embodiment, as shown by a dashed-dotted line in FIG. 10.

Figure 11:
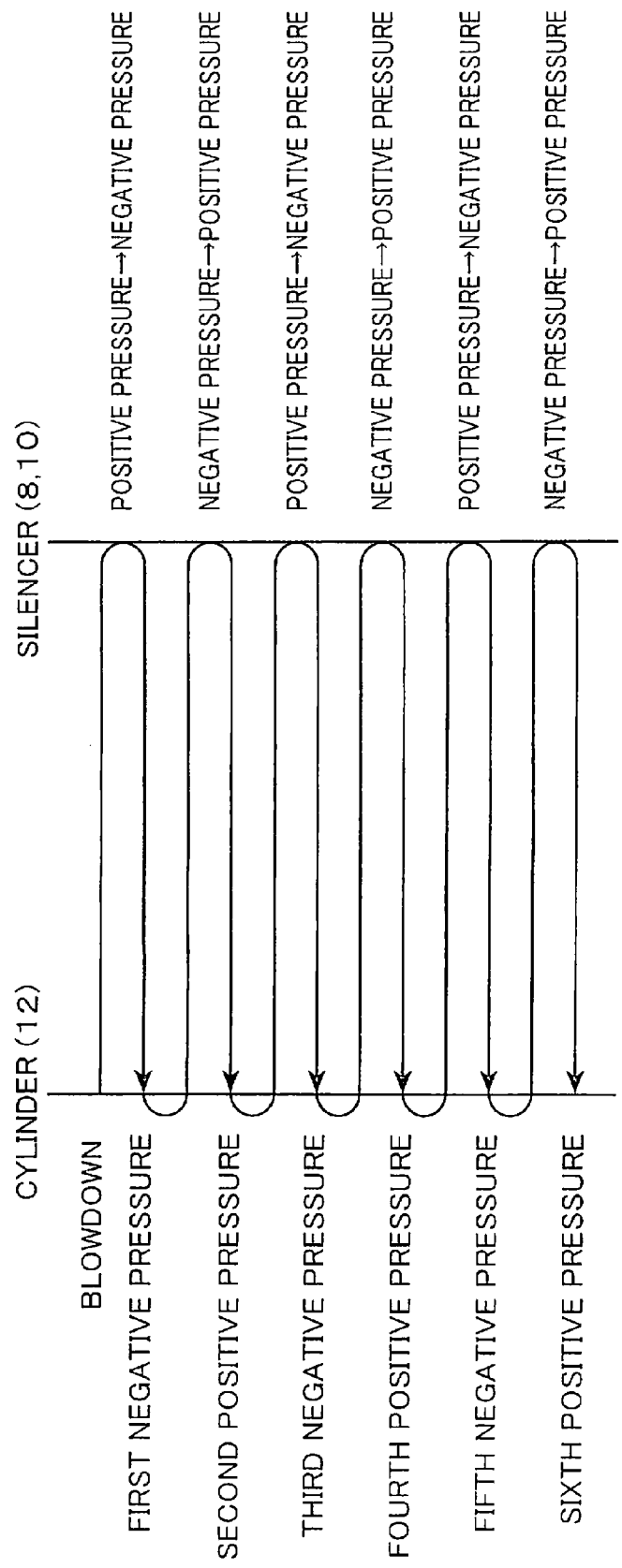
FIG. 11 is an illustration diagram showing a state where a pressure wave reciprocates between a cylinder and a pre-silencer or a main silencer.
Figure 12:
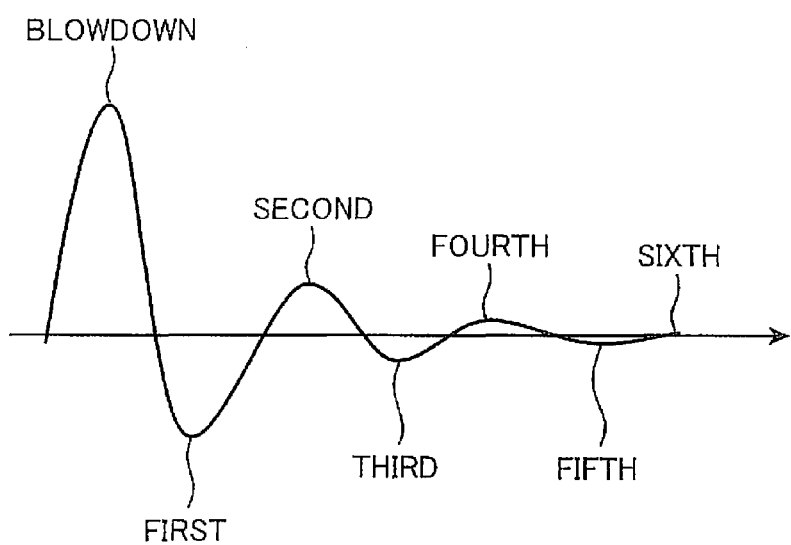
FIG. 12 is a timing diagram showing a change in pressure generated at an exhaust port of the cylinder.

In each cylinder 12, a high pressure wave (positive pressure wave) due to blowdown is generated immediately after opening of the exhaust valve 20, thereby generating an exhaust pulse within the exhaust manifold 5 and an exhaust passage downstream from the exhaust manifold 5. As shown in FIG. 11, the exhaust pulse is a phenomenon in which a part of a pressure wave is reflected repeatedly to reciprocate between the cylinder 12 and the pre-silencer 8 that is the cavity expansion chamber or the main silencer 10. When the pressure wave is reflected by the pre-silencer 8 or the main silencer 10, a reversal of positive pressure and negative pressure occurs, and a negative pressure wave and a positive pressure wave reach the exhaust port 18 alternately. Specifically, a first reflected wave in the first round trip, a third reflected wave in the third round trip, a fifth reflected wave in the fifth round trip, and so forth are negative pressure waves, and a second reflected wave in the second round trip, a fourth reflected wave in the fourth round trip, a sixth reflected wave in the sixth round trip, and so forth are positive pressure waves. Therefore, as shown in FIG. 12, the pressure that acts on the exhaust port 18 decays along with the repetition of round trips of the pressure wave while changing alternately between negative pressure and positive pressure. If a negative pressure wave in such an exhaust pulse reaches the exhaust port 18 during the overlap period T_O/L as shown in FIG. 6 described above, an effect of sucking out exhaust from within the cylinder 12 to increase the scavenging properties can be obtained.

Figure 13:
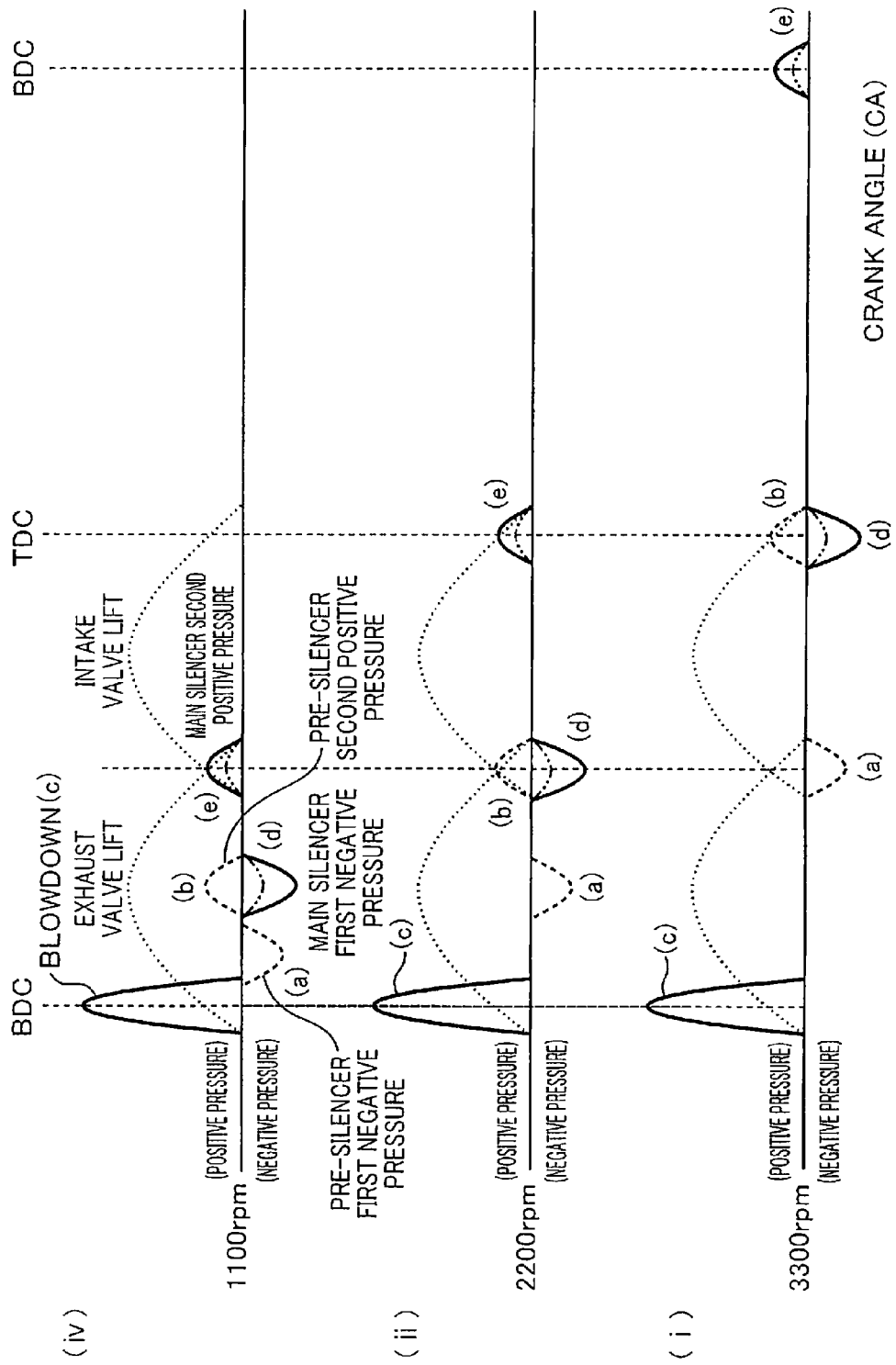
FIG. 13 is an illustration diagram of an effect (influence of a reflected wave from the pre-silencer or main silencer) in the embodiment.

FIG. 13 is an illustration diagram (in which the abscissa is a crank angle CA) showing timings at which the exhaust port 18 of the cylinder 12 is reached by a first negative pressure wave (a) generated by reflection, at the pre-silencer 8, of a positive pressure wave (c) generated by blowdown due to opening of the exhaust valve 20, a second positive pressure wave (b) generated by reflection at the pre-silencer 8, a first negative pressure wave (d) generated by reflection at the main silencer 10, and a second positive pressure wave (e) generated by reflection at the main silencer 10, with an engine rotation speed of 1100 rpm falling under the extremely low speed range (iv), an engine rotation speed of 2200 rpm falling under the low speed range (ii), and an engine rotation speed of 3300 rpm falling under the intermediate speed range (i). For the first negative pressure wave (d) and the second positive pressure wave (e) from the main silencer 10, a case where the pre-silencer 8 is absent between the cylinder 12 and the main silencer 10 is shown by a solid line, and a case where the pre-silencer 8 is present is shown by a dashed line. As shown in the drawing, the amplitude of the reflected waves (d) and (e) from the main silencer 10 are smaller in the case where the pre-silencer 8 is present (in dashed line) compared to the absent case (in solid line). The reason will be described later.

In the low speed range (ii), the first negative pressure wave (d) due to the reflection at the main silencer 10 reaches the exhaust port 18 during the overlap period T_O/L of the cylinder 12, but the second positive pressure wave (b) due to the reflection at the pre-silencer 8 also reaches the exhaust port 18 during the overlap period T_O/L of the cylinder 12. Therefore, the obtained effect of sucking out exhaust from within the cylinder 12 to increase the scavenging properties is not great.

As a result, as shown by a dotted line X in FIG. 10, improvement in the volumetric efficiency ($\eta V$) of the multicylinder engine according to this embodiment due to the influence of a reflected wave from the main silencer 10 is not great in the low speed range (ii) in which the engine rotation speed is relatively low (e.g., greater than or equal to 1200 rpm and less than 2500 rpm to 3000 rpm). In FIG. 10, a broken line shows the influence of a reflected wave from the main silencer 10 in the case where the pre-silencer 8 is absent, and the dotted line X shows the influence of a reflected wave from the main silencer 10 in the case where the pre-silencer 8 is present.

In the intermediate speed range (i), only the first negative pressure wave (a) due to reflection at the pre-silencer 8 reaches the exhaust port 18 during the overlap period T_O/L of the cylinder 12. Therefore, the obtained effect of sucking out exhaust from within the cylinder 12 to increase the scavenging properties is great.

As a result, as shown by a dashed double-dotted line in FIG. 10, the volumetric efficiency ($\eta V$) in the multicylinder engine according to this embodiment is improved by the first negative pressure wave (reflected wave) from the pre-silencer 8 in the intermediate speed range (i) in which the engine rotation speed is relatively at an intermediate level (e.g., greater than or equal to 2500 rpm to 3000 rpm and less than or equal to 3500 rpm to 4000 rpm).

In the extremely low speed range (iv), only the second positive pressure wave (e) due to reflection at the main silencer 10 reaches the exhaust port 18 during the overlap period T_O/L of the cylinder 12. However, as described later, the amplitude of the second positive pressure wave (e) is reduced by providing the pre-silencer 8 compared to a case where only the main silencer 10 is disposed. As a result, the effect of sucking out exhaust from within the cylinder 12 to increase the scavenging properties increases.

As a result, as shown by the dotted line X in FIG. 10, the volumetric efficiency ($\eta V$) in the multicylinder engine according to this embodiment is improved, compared to the case where only the main silencer 10 is disposed, by the pressure wave from the main silencer 10 being reduced by providing the pre-silencer 8 in the extremely low speed range (iv) in which the engine rotation speed is relatively extremely low (e.g., less than 1200 rpm). The reason will be described later.

In order for such effect of the negative pressure wave (reflected wave) from the pre-silencer 8 or the main silencer 10 in the extremely low speed range (iv), the low speed range (ii), and the intermediate speed range (i) to be exerted sufficiently in a favorable manner, the distance L2 shown in FIG. 8 described above is set to be 1600 mm to 2000 mm, preferably about 1800 mm, and the distance L3 shown in FIG. 8 described above is set to be 3800 mm to 4200 mm, preferably about 4000 mm.

Figure 14:
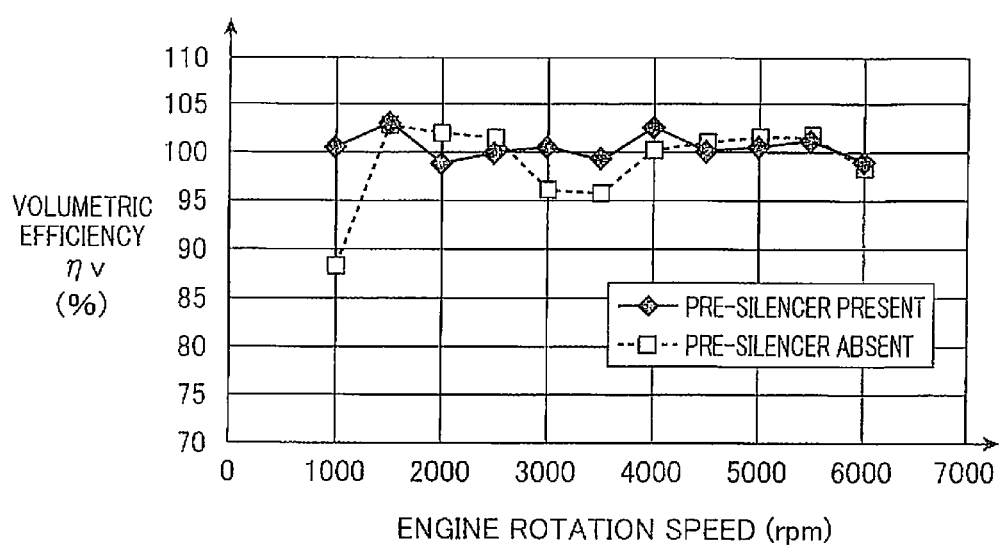
FIG. 14 is an illustration diagram of an effect (improvement in volumetric efficiency) in the embodiment.

As a prototype test, how the volumetric efficiency (ηV) changes in a range of 1000 rpm to 6000 rpm between a case (in white square marks in FIG. 14) where only the main silencer 10 is disposed with the distance L3 at 4000 mm and a case (in black diamond marks in FIG. 14) where the pre-silencer 8 is also disposed in addition to the main silencer 10 with the distance L2 at 1800 nm was examined with the exhaust system shown in FIG. 8. The result is shown in FIG. 14. The volumetric efficiencies (ηV) shown in FIG. 14 are all values reflecting the ejector effect and the inertia charging effect of intake air.

As is clear from FIG. 14, the volumetric efficiency (ηV) was improved in the intermediate speed range of 3000 rpm to 4000 rpm and the volumetric efficiency (ηV) was improved in the extremely low speed range of 1000 rpm in the case where the pre-silencer 8 is also disposed, compared to the case with only the main silencer 10. This is presumably because a reflection effect of the first negative pressure wave (a) from the pre-silencer 8 was exerted in the intermediate speed range, and because the pressure wave from the main silencer 10 was reduced by providing the pre-silencer 8 in the extremely low speed range.

That is, as shown by reference sign X in FIG. 10, the influence of a reflected wave from the main silencer 10 is flatter in the case (in dotted line) where the pre-silencer 8 is provided, compared to the case (in broken line) where the pre-silencer 8 is not provided. As a result, the influence of a reflected wave from the main silencer 10 improves around 1000 rpm and decreases around 2000 rpm (there is not much change around 3000 rpm). The reason the influence of a reflected wave from the main silencer 10 improves around 1000 rpm is roughly presumed as follows. When the pre-silencer 8 is absent between the cylinder 12 and the main silencer 10, a positive pressure wave generated by blowdown is entirely reflected by the main silencer 10. However, when the pre-silencer 8 is present between the cylinder 12 and the main silencer 10, a part of the positive pressure wave generated by blowdown is reflected by the pre-silencer 8, and the rest transmits through the pre-silencer 8 to be reflected by the main silencer 10. The pressure wave (transmitted wave) transmitted through the pre-silencer 8 decreases in amplitude. Therefore, the amplitude of the pressure wave (transmitted wave) that has reached the main silencer 10 is decreased, and the amplitude of a reflected wave from the main silencer 10 is decreased. As a result, when the pre-silencer 8 is present, the influence of the reflected wave from the main silencer 10 smaller compared to when absent. As a result, as shown in the extremely low speed range (iv) in FIG. 13, the amplitude of the second positive pressure wave (e) from the main silencer 10 is smaller when the pre-silencer 8 is present compared to when absent. As a result, the influence of a reflected wave from the main silencer 10 improves in the extremely low speed range (iv) around 1000 rpm.

In the low speed range of 1500 rpm to 2000 rpm, a decrease in volumetric efficiency (ηV) was seen in the case where the pre-silencer 8 is also disposed compared to the case with only the main silencer 10. This is presumably because the second positive pressure wave (b) from the pre-silencer 8 reached the exhaust port 18 during the open period of the cylinder 12. However, since this region is in an excessive scavenging state where new air that has entered from the intake valve 19 exits from the exhaust valve 20, it is presumed that a decrease in the amount of new air that actually remains within the cylinder (decrease in torque) is small even if the volumetric efficiency (ηV) decreases.

(4) Effect of this Embodiment

This embodiment provides the exhaust device 100 for a multicylinder engine, including the plurality of cylinders 12 each including the intake port 17, the exhaust port 18, the intake valve 19 capable of opening and closing the intake port 17, and the exhaust valve 20 capable of opening and closing the exhaust port 18. The exhaust device 100 includes the plurality of independent exhaust passages 52 of which the upstream end is connected to the exhaust port 18 of one cylinder 12 or a plurality of the cylinders 12 that are non-sequential in exhaust order and the mixing pipe 50 connected to the downstream ends of the respective independent exhaust passages 52 and into which exhaust that has passed through the respective independent exhaust passages 52 flows. The downstream ends of the respective independent exhaust passages 52 are connected in a bundled form to the mixing pipe 50. Valve driving devices 30 and 40 for driving the intake valve 19 and the exhaust valve 20 of each cylinder 12 are provided, so that the open period of the exhaust valve 20 and the open period of the intake valve 19 of the respective cylinders 12 overlap for a predetermined period and, for cylinders 12, 12 that are sequential in exhaust order, the exhaust valve 20 of the subsequent cylinder 12 opens during the overlap period T_O/L of the preceding cylinder 12 in predetermined operation regions (low speed range (ii) and intermediate speed range (i)). In the exhaust passage downstream from the mixing pipe 50, the pre-silencer 8 including the space section in which the flow path sectional area is increased is disposed. The distance L2 from the seating position of the exhaust valve 20 to the upstream end of the pre-silencer 8 in the exhaust port 18 of each cylinder 12 is set to the distance L2 such that, in the intermediate speed range (i) in which the engine rotation speed is greater than or equal to the first reference rotation speed Ne1 set in advance and less than or equal to the second reference rotation speed Ne2 set in advance to be higher than the first reference rotation speed Ne1, the negative pressure wave (a) is generated due to the exhaust pressure wave (c) generated by opening the exhaust valve 20 reaching and being reflected by the pre-silencer 8 and the negative pressure wave (a) reaches the exhaust port 18 of the cylinder 12 during the overlap period T_O/L in which the open period of the exhaust valve 20 and the open period of the intake valve 19 of the cylinder 12 of which the exhaust valve 20 has been opened overlap for a predetermined period.

With this embodiment, negative pressure is generated within the mixing pipe 50 by exhaust that has passed through each independent exhaust passage 52 flowing into the mixing pipe 50, and the ejector effect in which exhaust within another independent exhaust passage 52 or the exhaust port 18 of another cylinder 12 communicating therewith is sucked out to the downstream side is obtained due to the negative pressure. In predetermined operation regions (low speed range (ii) and intermediate speed range (i)) in which the engine rotation speed is less than or equal to the second reference rotation speed Ne2 at this time, the overlap period in which the exhaust valve 20 and the intake valve 19 of each cylinder 12 are both in an opened state is provided, and, for the cylinders 12, 12 that are sequential in exhaust order, the exhaust valve 20 of the subsequent cylinder 12 opens during the overlap period T_O/L of the preceding cylinder 12. Therefore, the ejector effect extends to the intake port 19 of the preceding cylinder 12 in the overlap period T_O/L. Accordingly, scavenging in the preceding cylinder 12 is further promoted, and the volumetric efficiency (ηV) is further improved to thus further improve the torque.

On that basis, with this embodiment, the volumetric efficiency (ηV) is improved in the intermediate speed range (i) by a suck-out effect due to the negative pressure wave (a), and it is possible to prevent a fall in volumetric efficiency (ηV) in the intermediate speed range (i), since the pre-silencer 8 is disposed in the exhaust passage downstream from the mixing pipe 50, the negative pressure wave (a) is generated due to the exhaust pressure wave (c) generated by opening the exhaust valve 20 reaching and being reflected by the pre-silencer 8 at least in the first operation region (intermediate speed range (i)) in which the engine rotation speed is between the first reference rotation speed Ne1 and the second reference rotation speed Ne2, and the negative pressure wave (a) reaches the exhaust port 18 of the cylinder 12 during the overlap period T_O/L of the cylinder 12 of which the exhaust valve 20 has been opened.

In this embodiment, the pre-silencer 8 is disposed relatively on the upstream side and the main silencer 10 is disposed relatively on the downstream side of the exhaust passage downstream from the mixing pipe 50. The distance L3 from the seating position of the exhaust valve 20 in the exhaust port 18 of each cylinder 12 to the upstream end of the main silencer 10 is set to the distance L3 such that, in the second operation region (low speed range (ii)) in which the engine rotation speed is less than the first reference rotation speed Ne1, the negative pressure wave (d) is generated due to the exhaust pressure wave (c) generated by opening the exhaust valve 20 reaching and being reflected by the main silencer 10 and the negative pressure wave (d) reaches the exhaust port 18 of the cylinder 12 during the overlap period T_O/L of the cylinder 12 of which the exhaust valve 20 has been opened.

Accordingly, a fall in volumetric efficiency (ηV) in the intermediate speed range (i) is prevented by the pre-silencer 8, and a fall in volumetric efficiency (ηV) in at least the low speed range (ii) in which the engine rotation speed is less than the first reference rotation speed Ne1 is prevented by the main silencer 10. Therefore, an increase in the range of torque is achieved, and a torque for easy driving is ensured over a wide rotation range.

In this embodiment, the intake system is set such that a positive pressure wave generated by reflection of a negative pressure wave of intake air generated by opening the intake valve 19 reaches the intake port 17 immediately before closing of the intake valve 19 in the third operation region (high speed range (iii)) in which the engine rotation speed exceeds the second reference rotation speed Ne2.

Accordingly, by the inertia charging effect of intake air, a fall in volumetric efficiency (ηV) in at least the high speed range (iii) in which the engine rotation speed exceeds the second reference rotation speed Ne2 is prevented. Therefore, a further increase in the range of torque is achieved, and a torque for easy driving is ensured over a further wide rotation range.

In this embodiment, the distance L1 from the seating position of the exhaust valve 20 in the exhaust port 18 of each cylinder 12 to the downstream end of each independent exhaust passage 52 is set to be less than or equal to 500 mm.

Accordingly, in the low speed range (ii) and the intermediate speed range (i), sufficient negative pressure is generated within the mixing pipe 50 by exhaust that has been discharged from each cylinder 12 and passed through each independent exhaust passage 52 flowing into the mixing pipe 50, and the ejector effect is exerted sufficiently in a favorable manner.

In this embodiment, the distance L2 from the seating position of the exhaust valve 20 in the exhaust port 18 of each cylinder 12 to the pre-silencer 8 is set to be 1600 mm to 2000 mm.

Accordingly, in the extremely low speed range (iv) and the intermediate speed range (i), the effect of a negative pressure wave (reflected wave) from the pre-silencer 8 is exerted sufficiently in a favorable manner.

In this embodiment, the distance L3 from the seating position of the exhaust valve 20 in the exhaust port 18 of each cylinder 12 to the main silencer 10 is set to be 3800 mm to 4200 mm.

Accordingly, in the low speed range (ii), the effect of a negative pressure wave (reflected wave) from the main silencer 10 is exerted sufficiently in a favorable manner.

In this embodiment, the catalyst cases of the catalytic devices 6 and 7 that accommodate the catalyst carrier are disposed in the exhaust passage downstream from the mixing pipe 50, the pre-silencer 8 is disposed in the exhaust passage downstream from the catalyst cases, and the increase rate A of the flow path sectional area of the pre-silencer 8 with respect to the flow path sectional area of the exhaust passage connected to the upstream side of the pre-silencer 8 and the increase rate B of the flow path sectional area of the catalyst case with respect to the flow path sectional area of the exhaust passage connected to the upstream side of the catalyst case are set such that A>B.

Accordingly, in the pre-silencer 8 and the catalyst cases of the catalytic devices 6 and 7 disposed upstream therefrom, the increase rate A of the flow path sectional area on the pre-silencer 8 side is greater than the increase rate B of the flow path sectional area on the catalyst case side. Therefore, there are less reflected waves from the catalyst case and more reflected waves from the pre-silencer 8. Therefore, even if the catalyst case is disposed upstream from the pre-silencer 8, the influence of a reflected wave from the pre-silencer 8 is ensured.

The technical feature of this embodiment is summarized as follows.

This embodiment discloses the exhaust device 100 for a multicylinder engine, including a plurality of the cylinders 12 each including the intake port 17, the exhaust port 18, the intake valve 19 capable of opening and closing the intake port 17, and the exhaust valve 20 capable of opening and closing the exhaust port 18, wherein the exhaust device includes a plurality of the independent exhaust passages 52 each having an upstream end connected to the exhaust port 18 of one cylinder 12 or a plurality of the cylinders 12 that are non-sequential in exhaust order, and the mixing pipe 50 connected to downstream ends of the respective independent exhaust passages 52 and into which exhaust that has passed through the respective independent exhaust passages 52 flows, the downstream ends of the respective independent exhaust passages 52 are connected in a bundled form to the mixing pipe 50, the cavity expansion chamber 8 including a space section in which a flow path sectional area is increased is disposed in an exhaust passage downstream from the mixing pipe 50, the distance L2 from a seating position of the exhaust valve 20 in the exhaust port 18 of each cylinder 12 to an upstream end of the cavity expansion chamber 8 is set to the distance L2 such that, in the first operation region (i) including at least the intermediate speed range (i) in which an engine rotation speed is greater than or equal to the first reference rotation speed Ne1 set in advance and less than or equal to the second reference rotation speed Ne2 higher than the first reference rotation speed Ne1, the negative pressure wave (a) is generated due to the exhaust pressure wave (c) generated by opening the exhaust valve 20 reaching and being reflected by the cavity expansion chamber 8 and the negative pressure wave (a) reaches the exhaust port 18 of the cylinder 12 during the overlap period T_O/L in which an open period of the exhaust valve 20 and an open period of the intake valve 19 of the cylinder 12 of which the exhaust valve 20 has been opened overlap for a predetermined period, and the valve driving devices 30 and 40 for driving the intake valve 19 and the exhaust valve 20 of each cylinder 12 are provided, so that an open period of the exhaust valve 20 and an open period of the intake valve 19 of the respective cylinders 12 overlap for a predetermined period and, for cylinders 12, 12 that are sequential in exhaust order, the exhaust valve 20 of the subsequent cylinder 12 opens during the overlap period T_O/L of the preceding cylinder 12 in the predetermined operation regions (ii) and (i) including at least the low and intermediate speed ranges (ii) and (i) in which an engine rotation speed is less than or equal to the second reference rotation speed Ne2.

With this embodiment, negative pressure is generated within the mixing pipe 50 by exhaust that has passed through each independent exhaust passage 52 flowing into the mixing pipe 50, and the ejector effect in which exhaust within another independent exhaust passage 52 or the exhaust port 18 of another cylinder 12 communicating therewith is sucked out to the downstream side is obtained due to the negative pressure. In the predetermined operation regions (ii) and (i) including at least the low and intermediate speed ranges (ii) and (i) in which the engine speed is less than or equal to the second reference rotation number Ne2 at this time, the overlap period in which the exhaust valve 20 and the intake valve 19 of each cylinder 12 are both in an opened state is provided, and, for the cylinders 12, 12 that are sequential in exhaust order, the exhaust valve 20 of the subsequent cylinder 12 opens during the overlap period T_O/L of the preceding cylinder 12. Therefore, the ejector effect extends to the intake port 19 of the preceding cylinder 12 in the overlap period T_O/L. Accordingly, scavenging in the preceding cylinder 12 is further promoted, and the volumetric efficiency ($\eta V$) is further improved to thus further improve the torque.

On that basis, with this embodiment, the volumetric efficiency ($\eta V$) is improved in the intermediate speed range (i) by a suck-out effect due to the negative pressure wave (a), and it is possible to prevent a fall in volumetric efficiency ($\eta V$) in the intermediate speed range (i), since the cavity expansion chamber 8 is disposed in the exhaust passage downstream from the mixing pipe 50, the negative pressure wave (a) is generated due to the exhaust pressure wave (c) generated by opening the exhaust valve 20 reaching and being reflected by the pre-silencer 8 at least in the intermediate speed range (i) in which the engine rotation speed is between the first reference rotation speed Ne1 and the second reference rotation speed Ne2, and the negative pressure wave (a) reaches the exhaust port 18 of the cylinder 12 during the overlap period T_O/L of the cylinder 12 of which the exhaust valve 20 has been opened.

This embodiment indicates that the pre-silencer 8 is disposed relatively on an upstream side and the main silencer 10 is disposed relatively on a downstream side of an exhaust passage downstream from the mixing pipe 50, the cavity expansion chamber 8 is the pre-silencer 8, and the distance L3 from a seating position of the exhaust valve 20 in the exhaust port 18 of each cylinder 12 to an upstream end of the main silencer 10 is set to the distance L3 such that, in the second operation region (ii) including at least the low speed range (ii) in which an engine rotation speed is less than the first reference rotation speed Ne1, the negative pressure wave (d) is generated due to the exhaust pressure wave (c) generated by opening the exhaust valve 20 reaching and being reflected by the main silencer 10 and the negative pressure wave (d) reaches the exhaust port 18 of the cylinder 12 during the overlap period T_O/L in which an open period of the exhaust valve 20 and an open period of the intake valve 19 of the cylinder 12 of which the exhaust valve 20 has been opened overlap for a predetermined period.

With this embodiment, a fall in volumetric efficiency ($\eta V$) is prevented by the pre-silencer 8 in the intermediate speed range (i) in which the inertia charging effect of intake air is minus (i.e., a negative pressure wave has an effect due to a pressure wave that reaches the intake port 17 immediately before closing of the intake valve 19 being out of timing), and a fall in volumetric efficiency ($\eta V$) is prevented by the main silencer 10 at least in the low speed range (ii) in which the engine rotation speed is less than the first reference rotation speed Ne1. Therefore, an increase in the range of torque is achieved, and a torque for easy driving is ensured over a wide rotation range.

This embodiment indicates that an intake system is set such that a positive pressure wave generated by reflection of a negative pressure wave of intake air generated by opening the intake valve 19 reaches the intake port 17 immediately before closing of the intake valve 19 in the third operation region (iii) including at least in the high speed range (iii) in which an engine rotation speed exceeds the second reference rotation speed Ne2.

With this embodiment, a fall in volumetric efficiency ($\eta V$) is prevented by the inertia charging effect of intake air in at least in the high speed range (iii) in which the engine rotation speed exceeds the second reference rotation speed Ne2. Therefore, a further increase in the range of torque is achieved, and a torque for easy driving is ensured over a further wide rotation range.

This embodiment indicates that the distance L1 from a seating position of the exhaust valve 20 in the exhaust port 18 of each cylinder 12 to a downstream end of each independent exhaust passage 52 is set to be less than or equal to 500 mm.

With this embodiment, sufficient negative pressure is generated within the mixing pipe 50 by exhaust that has been discharged from each cylinder 12 and passed through each independent exhaust passage 52 flowing into the mixing pipe 50, and the ejector effect is exerted sufficiently in a favorable manner.

This embodiment indicates that a catalyst case that accommodates a catalyst carrier is disposed in an exhaust passage downstream from the mixing pipe 50, the cavity expansion chamber 8 is disposed in an exhaust passage downstream from the catalyst case, and the increase rate A of a flow path sectional area of the cavity expansion chamber 8 with respect to a flow path sectional area of an exhaust passage connected to an upstream side of the cavity expansion chamber 8 and the increase rate B of a flow path sectional area of the catalyst case with respect to a flow path sectional area of an exhaust passage connected to an upstream side of the catalyst case are set such that A>B.

With this embodiment, in the cavity expansion chamber 8 and the catalyst case disposed upstream therefrom, the increase rate A of the flow path sectional area on the cavity expansion chamber 8 side is greater than the increase rate B of the flow path sectional area on the catalyst case side. Therefore, there are less reflected waves from the catalyst case and more reflected waves from the pre-silencer 8. Therefore, even if the catalyst case is disposed upstream from the cavity expansion chamber 8, the influence of a reflected wave from the cavity expansion chamber 8 is ensured.

With this embodiment, it is possible to prevent a fall in volumetric efficiency (ηV) in the intermediate speed range (i) in a multicylinder engine. As a result, the torque is improved over a wide rotation range, flat torque characteristics are obtained, and a multicylinder engine in which the range of torque has been increased is obtained.

(5) Modified Example of this Embodiment

Depending on the situation, the direct catalyst 6, the underfoot catalyst 7, or the like may be used as the cavity expansion chamber instead of the pre-silencer 8 or together with the pre-silencer 8.

The mixing pipe 50 may include (without the straight section 57 and the diffuser section 58) only the converging section 56 in which the flow path sectional area is reduced or may include (without the straight section 57) only the converging section 56 and the diffuser section 58 in which the flow path sectional area is increased. The ejector effect is obtained also through use of a mixing pipe with such a configuration. For example, a mixing pipe including only the converging section 56 in the case where the mixing pipe 50 is shortened due to restriction or the like in layout at the time of mass production design or a mixing pipe with a shape in which the straight section is omitted such that the converging section 56 and the diffuser section 58 are directly and smoothly joined along a curved surface is also acceptable.

It may be such that the overlap period T_O/L of the intake valve 19 and the exhaust valve 20 is provided only in a high load range of the low and intermediate speed ranges (ii) and (i).

This application is based on Japanese Patent Application No. 2011-260600 filed on Nov. 29, 2011, and the content thereof is included in this application.

In order to illustrate the present invention, the present invention has been described above appropriately and sufficiently through the embodiment with reference to the drawings. However, it should be recognized that modification and/or improvement of the embodiment described above is easily possible for those skilled in the art. Thus, it is construed that, as long as a modified embodiment or improved embodiment carried out by those skilled in the art is not of a degree that departs from the scope of claims, such modified embodiment or improved embodiment is within the scope of claims.

INDUSTRIAL APPLICABILITY

The present invention is industrially applicable over a wide range in the technical field of an exhaust device for a multicylinder engine mounted to an automobile or the like.

The invention claimed is:

1. An exhaust device for a multicylinder engine, comprising a plurality of cylinders each including an intake port, an exhaust port, an intake valve capable of opening and closing the intake port, and an exhaust valve capable of opening and closing the exhaust port, wherein the exhaust device comprises a plurality of independent exhaust passages, each of the plurality of independent exhaust passages having at least one upstream end and a downstream end, each upstream end connected to an exhaust port of one cylinder of the plurality of cylinders, which are non-sequential in exhaust order, and a mixing pipe including an upstream end connected to each downstream end of each respective independent exhaust passage and into which exhaust that has passed through the respective independent exhaust passages flows, each downstream end of each respective independent exhaust passage being connected in a bundled form to the upstream end of the mixing pipe to form a bundle of independent exhaust passage downstream ends, a pre-silencer and a main silencer including a space section in which a flow path sectional area is increased are disposed in an exhaust passage downstream from the mixing pipe in such an order that the main silencer is located on a downstream side of the pre-silencer, a first distance from a seating position of the exhaust valve in the exhaust port of each cylinder to an upstream end of the pre-silencer is set to a distance such that, in a first operation region including at least an intermediate speed range in which an engine rotation speed is greater than or equal to a first reference rotation speed set in advance and less than or equal to a second reference rotation speed higher than the first reference rotation speed, a first negative pressure wave is generated due to an exhaust pressure wave generated by opening the exhaust valve reaching and being reflected by the pre-silencer and the first negative pressure wave reaches the exhaust port of the cylinder during a first overlap period in which an open period of the exhaust valve and an open period of the intake valve of the cylinder of which the exhaust valve has been opened overlap for a first predetermined period, a second distance from the seating position of the exhaust valve in the exhaust port of each cylinder to an upstream end of the main silencer is set to a distance such that, in a second operation region including at least a low speed range in which the engine rotation speed is less than the first reference rotation speed, a second negative pressure wave is generated due to an exhaust pressure wave generated by opening the exhaust valve reaching and being reflected by the main silencer and the second negative pressure wave reaches the exhaust port of the cylinder during a second overlap period in which an open period of the exhaust valve and an open period of the intake valve of the cylinder of which the exhaust valve has been opened overlap for a second predetermined period, and a valve driving device configured to open and close the intake valve and the exhaust valve of each cylinder is provided so that an open period of the exhaust valve and an open period of the intake valve of each cylinder overlap for one of the first predetermined period, the second predetermined period, and a third predetermined period different from the first predetermined period and the second predetermined period, and, for cylinders that are sequential in exhaust order, the exhaust valve of a subsequent cylinder opens during an overlap period of a preceding cylinder, in a predetermined operation region including at least low and intermediate speed ranges in which the engine rotation speed is less than or equal to the second reference rotation speed.

2. The exhaust device for a multicylinder engine according to claim 1, wherein an intake system is set such that a positive pressure wave generated by reflection of a negative pressure wave of intake air generated by opening the intake valve reaches the intake port immediately before closing of the intake valve in a third operation region including at least a high speed range in which the engine rotation speed exceeds the second reference rotation speed.

3. The exhaust device for a multicylinder engine according to claim 2, wherein a third distance from the seating position of the exhaust valve in the exhaust port of each cylinder to a downstream end of each independent exhaust passage is set to be less than or equal to 500 mm.

4. The exhaust device for a multicylinder engine according to claim 3, wherein a catalyst case that accommodates a catalyst carrier is disposed in the exhaust passage downstream from the mixing pipe, the pre-silencer is disposed in the exhaust passage downstream from the catalyst case, and an increase rate A of a flow path sectional area of the pre-silencer with respect to a flow path sectional area of the exhaust passage connected to the upstream end of the pre-silencer and an increase rate B of a flow path sectional area of the catalyst case with respect to a flow path sectional area of the exhaust passage connected to an upstream side of the catalyst case are set such that A>B.

5. The exhaust device for a multicylinder engine according to claim 2, wherein a catalyst case that accommodates a catalyst carrier is disposed in the exhaust passage downstream from the mixing pipe, the pre-silencer is disposed in the exhaust passage downstream from the catalyst case, and an increase rate A of a flow path sectional area of the pre-silencer with respect to a flow path sectional area of the exhaust passage connected to the upstream end of the pre-silencer and an increase rate B of a flow path sectional area of the catalyst case with respect to a flow path sectional area of the exhaust passage connected to an upstream side of the catalyst case are set such that A>B.

6. The exhaust device for a multicylinder engine according to claim 1, wherein a third distance from the seating position of the exhaust valve in the exhaust port of each cylinder to a downstream end of each independent exhaust passage is set to be less than or equal to 500 mm.

7. The exhaust device for a multicylinder engine according to claim 6, wherein a catalyst case that accommodates a catalyst carrier is disposed in the exhaust passage downstream from the mixing pipe, the pre-silencer is disposed in the exhaust passage downstream from the catalyst case, and an increase rate A of a flow path sectional area of the pre-silencer with respect to a flow path sectional area of the exhaust passage connected to the upstream end of the pre-silencer and an increase rate B of a flow path sectional area of the catalyst case with respect to a flow path sectional area of the exhaust passage connected to an upstream side of the catalyst case are set such that A>B.

8. The exhaust device for a multicylinder engine according to claim 1, wherein a catalyst case that accommodates a catalyst carrier is disposed in the exhaust passage downstream from the mixing pipe, the pre-silencer is disposed in the exhaust passage downstream from the catalyst case, and an increase rate A of a flow path sectional area of the pre-silencer with respect to a flow path sectional area of the exhaust passage connected to the upstream end of the pre-silencer and an increase rate B of a flow path sectional area of the catalyst case with respect to a flow path sectional area of the exhaust passage connected to an upstream side of the catalyst case are set such that A>B.

9. The exhaust device for a multicylinder engine according to claim 1, wherein the independent exhaust passage includes a downstream section having a shape in which a flow path sectional area thereof decreases in a downstream direction, the downstream section including a downstream end connected to the mixing pipe.

10. An exhaust device for a multicylinder engine, comprising four cylinders each including an intake port, an exhaust port, an intake valve capable of opening and closing the intake port, and an exhaust valve capable of opening and closing the exhaust port, wherein the exhaust device comprises: two independent exhaust passages having corresponding upstream ends respectively connected to an exhaust port of a first cylinder and an exhaust port of a fourth cylinder; a single common independent exhaust passage having two divided upstream ends respectively connected to an exhaust port of a second cylinder and an exhaust port of a third cylinder, the second and third cylinders being non-sequential in exhaust order; and a mixing pipe connected to downstream ends of the respective independent exhaust passages and into which exhaust that has passed through the respective independent exhaust passages flows, the downstream ends of the respective independent exhaust passages are directly connected in a bundled form to the mixing pipe, a pre-silencer and a main silencer including a space section in which a flow path sectional area is increased are disposed in an exhaust passage downstream from the mixing pipe in such an order that the main silencer is located on a downstream side of the pre-silencer, a first distance from a seating position of the exhaust valve in the exhaust port of each cylinder to an upstream end of the pre-silencer is set to a distance such that, in a first operation region including at least an intermediate speed range in which an engine rotation speed is greater than or equal to a first reference rotation speed set in advance and less than or equal to a second reference rotation speed higher than the first reference rotation speed, a first negative pressure wave is generated due to an exhaust pressure wave generated by opening the exhaust valve reaching and being reflected by the pre-silencer and the first negative pressure wave reaches the exhaust port of the cylinder during a first overlap period in which an open period of the exhaust valve and an open period of the intake valve of the cylinder of which the exhaust valve has been opened overlap for a first predetermined period, a second distance from the seating position of the exhaust valve in the exhaust port of each cylinder to an upstream end of the main silencer is set to a distance such that, in a second operation region including at least a low speed range in which the engine rotation speed is less than the first reference rotation speed, a second negative pressure wave is generated due to an exhaust pressure wave generated by opening the exhaust valve reaching and being reflected by the main silencer and the second negative pressure wave reaches the exhaust port of the cylinder during a second overlap period in which an open period of the exhaust valve and an open period of the intake valve of the cylinder of which the exhaust valve has been opened overlap for a second predetermined period, and a valve driving device for driving the intake valve and the exhaust valve of each cylinder is provided so that an open period of the exhaust valve and an open period of the intake valve of each cylinder overlap for one of the first predetermined period, the second predetermined period, and a third predetermined period different from the first predetermined period and the second predetermined period, and, for cylinders that are sequential in exhaust order, the exhaust valve of a subsequent cylinder opens during an overlap period of a preceding cylinder, in a predetermined operation region including at least low and intermediate speed ranges in which the engine rotation speed is less than or equal to the second reference rotation speed.

11. The exhaust device for a multicylinder engine according to claim 10, wherein
the independent exhaust passage includes a downstream section having a shape in which a flow path sectional area thereof decreases in a downstream direction, the downstream section including a downstream end connected to the mixing pipe.

12. The exhaust device for a multicylinder engine according to claim 11, wherein the bundle of independent exhaust passage downstream ends converge so as to be adjacent to each other.

13. The exhaust device for a multicylinder engine according to claim 12, wherein the bundle of independent exhaust passage downstream ends forms an approximately circular sectional surface as a whole.

14. The exhaust device for a multicylinder engine according to claim 10, wherein the bundle of independent exhaust passage downstream ends converge so as to be adjacent to each other.

15. The exhaust device for a multicylinder engine according to claim 14, wherein the bundle of independent exhaust passage downstream ends forms an approximately circular sectional surface as a whole.

* * * * *